RAYMOND A. RUNYAN
INVENTOR.
BY
ATTORNEYS

Patented July 17, 1951

2,561,319

UNITED STATES PATENT OFFICE 2,561,319

TWO-PHASE INDUCTION MOTOR CONTROL

Raymond A. Runyan, South Glastonbury, Conn., assignor to Askania Regulator Company, Chicago, Ill., a corporation of Illinois Application February 11, 1949, Serial No. 75,800

7 Claims. (Cl. 318—28)

This invention relates to a control amplifier arranged for operation of a two phase induction motor, by means of which direction of operation of the motor may be selected by the phase relation between a reference alternating voltage and an alternating signal voltage the phase of which may be varied with respect to that of the reference voltage, the direction of such variation from a predetermined phase relation to the reference voltage serving as the signal that selects direction and initiates operation of the motor. The invention relates also to a repeater station arrangement for control of a two phase induction motor, including such a control amplifier and provided with a proportional feedback arrangement that cooperates in novel fashion with the amplifier to proportion operation of the motor to degree of variance of the phase relation of the two voltages from the predetermined relation thus to serve as a position control station for a two phase induction motor.

In motor position control by means of a signal voltage the condition of which varies to indicate various positions that the controlled motor is to assume, for accurate operation of the repeater motor it is necessary that there be present at the repeater station a standard condition to which the condition of the signal voltage may be compared and which must be identical with the standard at the control or transmitter station with reference to which the position-indicating conditions of the signal voltage are produced. Phase variation of a voltage presents a very valuable means for signal voltage control of a repeater motor, since there are no limits to the degree to which voltage phase may be shifted from a reference condition, whereas frequency and amplitude variations of signal voltages both have limits. Thus a repeater motor controlled by a variable phase voltage may be driven through an unlimited number of revolutions by a control device arranged to shift the phase of the signal voltage, while a motor controlled by a signal voltage of amplitude or frequency varied by a control device may be driven only through a number of revolutions determined by the range of frequency or amplitude variation that the director is capable of producing and/or to which the repeater control amplifier is responsive.

As suggested above, the present invention relates to variable phase voltage control of a two phase induction motor, and satisfies the requirement for accurate operation by comparison of the variable phase signal voltage with a standard, so that the phase condition of the signal voltage accurately is representative of a direction of motion of the motor, and according to a second aspect of the invention, is also accurately representative of a position to be assumed by the motor.

One of the most effective types of device for translating an angular position, for example that of a director member or that of a repeater motor, into phase condition of a signal voltage, is a device for producing a rotating field, energized by a three phase source, to which is coupled a single phase output circuit, the assembly being so arranged as to provide for mechanical selection of the coupling in accordance with the position to be indicated, and to determine the phase condition of a single phase voltage in the output by the coupling. The phase of the output circuit voltage thereby accurately represents the condition. A synchro control transformer with its three phase winding energized by a three phase source as the primary and its single phase winding serving as the secondary or output circuit is a typical but not exclusive example of such devices. A convenient standard for determining the phase condition of the single phase output voltage is the phase of the energizing three phase voltage.

In situations where it is not possible to provide three wire direct conductive communications from control to repeater station, as in radio control, provision of a three phase voltage at the repeater station by the same channel that carries the signal voltage is impractical. My copending application for United States Patent, Serial No. 72,707, filed January 25, 1949, discloses and claims apparatus for providing at the repeater station a three phase voltage having to the signal voltage the same phase relation that the control position to phase translator energizing input had to the signal voltage during production of the latter. This arrangement involves production at the transmitter or control station of a single phase reference voltage, and simultaneous transmission to the repeater of the signal and single phase reference voltages, with conversion of the latter to a three phase voltage for energizing the repeater position to phase translator device. The present invention is suited to operation by single phase reference and variable phase signal voltages so produced and transmitted. Transmission may be by recording and reproducing, by radio, or by direct conductive communication, and the reference and signal voltages may be used as modulating voltages for carrier frequencies, subsequently either mixed for transmission by a common channel or transmitted over parallel channels. In any case, whether by direct conduction of the reference or signal voltage, or by their reproduction from a record or from modulated carriers, the two motor controlling voltages are available at the repeater station in the identical phase relation that prevailed during operation of the transmitter or control station. For purposes of the present invention it will be assumed that 180° phase opposition of the reference and signal voltages is a neutral condition, in a system for controlling only direction of operation of the motor representing a standstill condition, and in a position control system representing a neutral or zero motor position.

An object of the invention is the provision of a control amplifier arranged to compare phase of two input control voltages, and producing therefrom upon departure from a predetermined phase relation, two output voltages in phase quadrature, the identity of the leading output voltage being determined by the identity of the input voltage that leads the predetermined phase relation.

Another object is the provision of a control amplifier for a two phase induction motor, operated by two primary input control voltages, and capable of maintaining the motor at standstill when the input voltages are in phase opposition, and of operating the motor upon departure of the input voltages from phase opposition, in a direction determined by the input voltage that leads phase opposition to the other input voltage.

Another object is the provision of a novel combination with such an amplifier, of a proportional feedback translater device to afford position control of a two phase induction motor.

According to one aspect of the invention, the primary input control voltages, that is the reference and signal voltages, after preliminary amplification, are applied to two motor voltage control channels. One such channel, to the input of which both amplified control voltages are applied, compares phase of such voltage and produces a resultant that increases from a minimum that is ineffective to operate the motor, and that is produced by phase opposition of the control voltage, to motor-operating amplitudes produced by variance of the control voltages from phase opposition. This voltage, being a resultant of combined voltages that vary from phase opposition, is always substantially in phase quadrature with the control voltages. The second channel is a straight amplifying channel to which is applied a single one of the control voltages, so that the outputs of the two channels respectively are an amplified one of the primary control voltages, and an amplified resultant of the combined primary input voltages that is in substantial phase quadrature relation to the amplified control voltage. Furthermore the identity of the channel output voltage that leads in the phase quadrature relation is determined by the identity of the primary control voltage that leads the non-operating or neutral phase opposition condition of the primary control voltages. Application of the two channel output voltages to the respective windings of an induction two phase motor selects standstill or operative condition of the motor according to the phase opposition or variance from phase opposition of the control voltages, and direction of operation is determined by the identity of the control voltage that leads the neutral phase opposed condition. In other words, if the phase of one voltage be assumed to be constant, the leading or lagging by the other voltage of phase opposition to the constant phase voltage will result in operation of the motor in a corresponding direction, while phase opposition will produce motor standstill.

Figure 1:
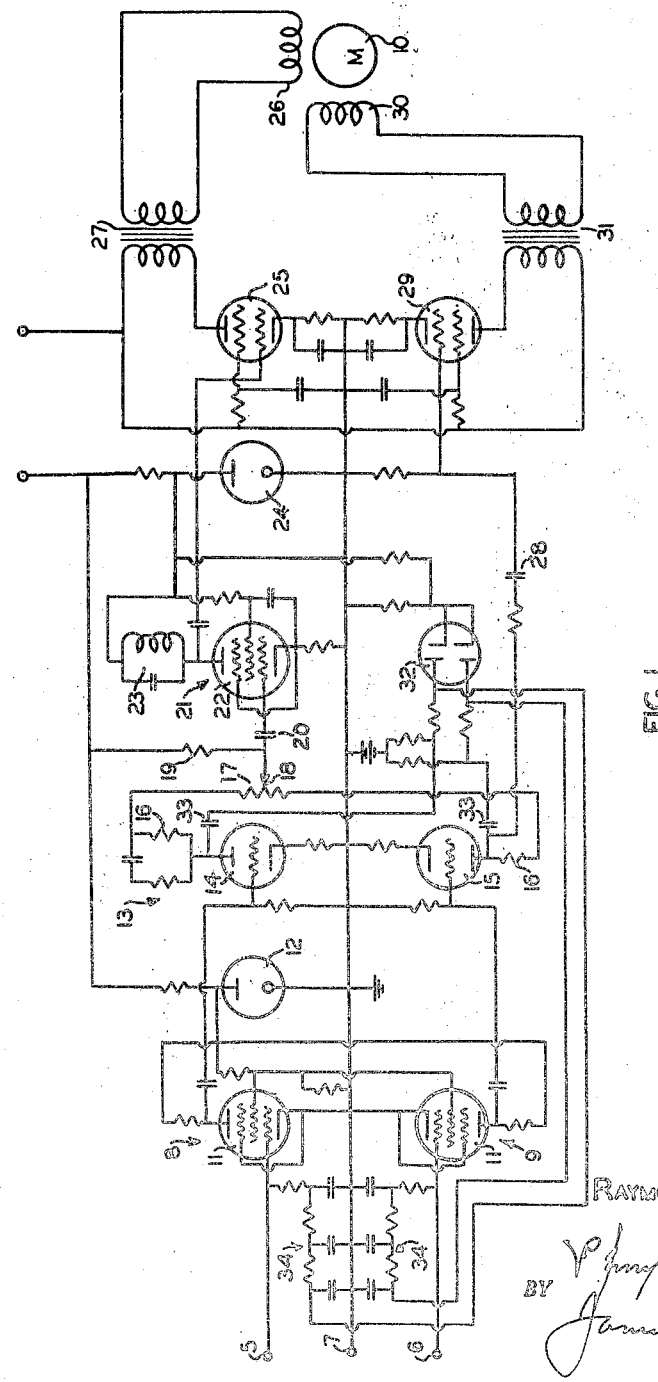
Fig. 1 is a schematic diagram of a two phase induction motor-control amplifier arranged in accordance with the invention.

Describing the drawings, Fig. 1 shows a practical arrangement exemplifying means for accomplishing the type of operation set forth in the preceding paragraph, for control of a two phase induction motor 4. This motor is of known form having two power inputs that require for motor operation application of two motor voltages in phase quadrature relation to each other, direction of operation being determined by the identity of the input to which the leading motor voltage is applied. Two system voltage input terminals 5 and 6, and a common return terminal 7, are arranged to apply the control or primary input voltages to the inputs of conventional amplifier stages 8 and 9, each comprising a voltage amplifier tube 11. The anodes of tubes 11 are supplied by B+ voltage controlled by a voltage regulator 12, and respectively are resistance capacity coupled to the inputs of an amplifying and phase comparison stage 13, which also constitutes the inputs to the two motor voltage control channels.

The stage 13 comprises amplifier tubes 14, 15, the control grids of which constitute the stage inputs. Each of tubes 14 and 15 has an individual plate resistance 16, that of one tube, shown as tube 15 serving as a coupling element to the input of the channel that amplifies a single one of the control voltages to motor power level. The remote ends of the individual plate resistances 16 also are connected to a summarizing or phase comparison network including a tapped resistance 17 to opposite ends of which the resistances 16 are connected and to the tap 18 of which is connected a common plate summarizing or comparison resistance 19 connected in the plate voltage supply circuit. It will be seen that the voltage of tap 18 is a resultant of the respective amplified control voltages which are applied to the respective ends of resistance 17, and understood that the voltage that appears across resistance 17 is the sum of the anode voltages of tubes 14, 15, and proportional to the sum of signal voltages applied to the grids of such tubes. If such signals are of equal frequencies, of equal amplitudes and of nearly opposite phase, their sum will be a small voltage nearly in phase quadrature with both such anode voltages and a voltage of amplitude proportional to such sum and in agreement with the phase of such sum will appear at tap 18. Amplitude of this sum signal, that is to say, the voltage at tap 18, depends upon the degree of deviation of the two anode voltages from phase opposition. The quadrature relation of this resultant-representing, variable amplitude voltage to the individual output of the tube 15 is significant in the two phase motor control.

The resultant voltage produced by the resistance 19 is applied through a coupling condenser 20 to a tuned amplifier stage 21, comprising a tube 22 having frequency acceptance determining means, shown as a tank circuit 23 in its anode circuit, to filter out harmonics produced in the summarizing circuit of the preceding stage. It is to be understood that the system works in audio ranges, and sixty cycles is a satisfactory frequency for the primary control voltages and output motor voltages. A voltage regulator 24 controls the anode supply of tube 22.

The output of the tuned amplifier stage 21 is resistance-capacity coupled to the input of a power amplifier tube 25, the output of which is at a motor voltage level and is loaded by one of the field windings 26 of the two phase induction motor 4, through a transformer 27.

Cooperating with the individual resistance 16 of tube 15, is a coupling condenser 28, serving as the individual primary control voltage amplifying channel input, and applying the voltage output of tube 15 to a second power amplifier tube 29, loaded by the second field winding 29 of the motor 4, through a transformer 31. The field windings 26, 29 of the motor 4 are quadrature windings, that is to say, they require for motor operation application of voltages in quadrature relation, the direction of motor operation depending on the identity of the winding to which the leading voltage is applied.

The foregoing control amplifier arrangement provides the required direction control of a two phase induction motor, and constitutes one aspect of the invention.

In the control amplifier, in order to minimize the effect of possible difference is amplitudes of the two primary control voltages, a stabilizing circuit is provided in the nature of a delayed automatic volume control circuit. This circuit comprises a double diode 32, the sections of which respectively are connected to control the outputs of the tubes 11 in accordance with the outputs of the tubes 14 and 15, by typical delayed volume control operation. To the inputs of the respective diode sections are applied the individual outputs of the phase comparison stage tubes 14, 15 by their individual plate resistances 16 and coupling condensers 33. The outputs of the diode sections respectively are applied to the control grids of the input stage tubes 11 through resistance-capacity networks 34. The illustrated compound character of the networks is provided to accomplish the extreme filtering action necessary to prevent oscillation in a circuit of this nature.

Figure 2:
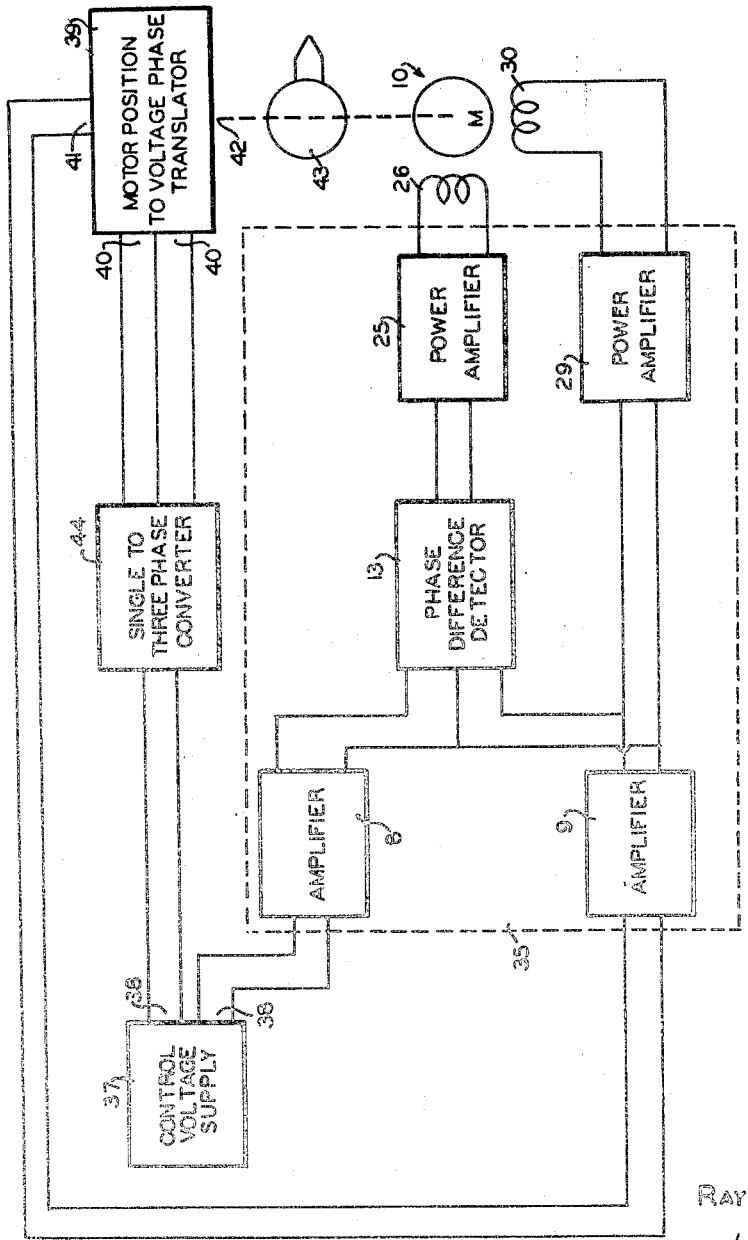
Fig. 2 is a block diagram of a repeater station for position control of a two phase induction motor, arranged according to the invention.

In Fig. 2 is shown a position control repeater station for control of a two phase induction motor 4 in accordance with degree of variance of phase of a signal voltage from a condition of phase opposition to a reference voltage. The station arrangement includes the control amplifier arrangement of Fig. 1, which is shown enclosed by the dotted line 36, and additional control voltage supply means and a proportional position feedback arrangement that renders the system suitable for position control.

The control voltage supply means 37 may be a device for reproducing signal and reference voltages produced elsewhere and transmitted to it by radio or communication, or from a record, and may include such devices as filters and demodulators, or it may be a control station for producing such voltages. One form of suitable device is disclosed by my copending application for United States Patent, Serial No. 72,708, filed January 25, 1949, which discloses and claims a convertible oscillator-modulator or filter, tuned amplifier and detector circuit arrangement for selective operation as a control or repeater station device. In any event, the device 37 is assumed to have two outputs at 38 that respectively constitutes an alternating reference voltage and a variable phase signal voltage, and further, that positions to be assumed by the two phase induction motor 4 are represented by variance of the signal voltage phase from 180° opposition to reference voltage phase.

The station is provided with a motor position to voltage phase translator device 39, which in the present instance is assumed to be of the kind, having a three phase input 40 requiring energization by three phase voltage, a single phase output 41 from a secondary single phase circuit, and a mechanical input operation of which varies the phase of the output voltage relative to the energizing three phase voltage by altering coupling between the two circuits. The mechanical input is driven by the motor 4 through a drive train 42, and a mechanical device 43 may be positioned by operation of the motors.

The arrangement resembles that of my noted copending application, Serial No. 72,708, in that it provides means in the form of a single to three phase converter circuit 44 for converting one of the output voltages of the device 37 to three phase voltage, suitable for energizing the translator device 39. In the present Fig. 2, the output of the translator device 39 is applied to an amplifier stage which corresponds to one of the primary stages of Fig. 1, and is designated 9 to indicate such correspondence. The second output of the device 37 is applied to the input of a second amplifier stage 8, similarly corresponding to stage 8 of Fig. 1. The output of stage 9, is applied both to one of the inputs of the phase difference detector stage 13 and the input of power amplifier 29. The output of the second primary stage 8 is applied to the second input of the phase difference detector, and the output of the latter is, as in Fig. 1, applied to power amplifier 25. The power amplifiers 29, respectively control energization of the field windings 26, 30 of the motor 4.

Operation of the station arrangement of Fig. 2 is as follows. When the outputs of the device 37 are in 180° phase opposition, it is assumed that the motor 4 and driven element 43 are in a neutral or zero position, and the output of the translating device 39 is in phase opposition to the second output voltage of the device 37. Upon departure of the output voltages of the device 37 from phase opposition, the phase of the converted three phase input to the translator primary circuit will shift, and the output voltage of the translator will accordingly shift from phase opposition to the second voltage output of device 37. The phase difference detector device thereupon will act, as described relative to Fig. 1, to produce in one motor field winding a voltage in quadrature with the amplified output voltage of device 37 that is applied to the other motor field winding. This will start motor 4 in a direction to operate the mechanical input of translator 39 to shift the output voltage of the latter toward phase opposition to the second output of the device 37. When such opposition is effected, the quadrature motor voltage output of the detector will disappear, and the motor will be in the position indicated by the degree and direction of variance from phase opposition of the two primary control voltages that are the outputs of the device 37.

From the foregoing it will be evident that the objects of providing direction control, and position control of a two phase induction motor by control voltages of reference and variable phase characteristics are accomplished respectively by the arrangements shown in Figs. 1 and 2. It will be understood that many variations may be made in the details of both the control amplifier and repeater station arrangements without departing from the fundamental principles and concepts of the invention, and accordingly that the scope of protection of the invention is to be determined by the appended claims rather than by the foregoing detailed disclosure.

I claim:

1. Means for controlling, by variance from a phase opposed condition of two control voltages, of a two phase motor having two power inputs that require for motor operation application of two voltages in phase quadrature relation, comprising; means for amplifying one such control voltage to motor power voltage level and for applying such amplified voltage to one said motor input, means for summarizing such control voltages to produce a resultant in phase quadrature relation to such amplified motor control voltage, and means for amplifying such resultant to motor power voltage level and for applying such amplified resultant voltage to the second motor input.

2. Means for controlling, by variance from a phase opposed condition of two control voltages of a two phase induction motor having quadrature field windings, comprising; a pair of voltage-amplifying channels having their outputs respectively coupled with the inputs to said windings, means for applying one such control voltage to the input of one said channel, a voltage summarizing circuit having two inputs and having its output coupled to the input of the second said channel, and means for applying such control voltages to the respective inputs of said summarizing channel.

3. Means for controlling, by variance from a phase opposed condition of two control voltages, of a two phase induction motor having quadrature field windings, comprising; a pair of amplifying stages having individual inputs for application respectively of such control voltage, a summarizing circuit comprising a common output circuit of said stages, an amplifying channel having its input coupled to said common output circuit and having its output coupled to one said field winding, a second amplifying channel having its output coupled to the other said field winding, and means for applying one said control voltage to the input of said second amplifying channel.

4. Means for controlling, by variance from a phase opposed condition of two control voltages, of a two phase induction motor having quadrature field windings, comprising; a pair of voltage amplifier tubes, means for applying such control voltages respectively to the control grids of said tubes, a common plate resistance in the anode supplies of said tubes, an amplifying channel having its output coupled to one of said windings and its input coupled to said plate resistance, a second amplifying channel having its output coupled to the other said field winding, and means for applying to the input of said second amplifying channel the individual output of one of said amplifier tubes.

5. Means for controlling, by variance from a phase opposed condition of two control voltages, of a two phase induction motor having quadrature field windings, comprising; a pair of voltage amplifier tubes, means for applying such control voltages respectively to the control grids of said tubes, a common anode supply to said tubes including a common plate resistance, and individual plate resistance connected between said common resistance and the anode of one said tube, a pair of amplifier channels having their outputs respectively coupled to said field windings, and means coupling to the respective inputs of said amplifying channels the output voltages of said common and individual plate resistances.

6. The combination with a two phase induction motor having quadrature field windings, and a pair of power amplifiers having control inputs and power outputs respectively controlling energization of said windings, of a pair of amplifier stages having individual control inputs and outputs, a voltage summarizing circuit having two inputs respectively energized by the individual outputs of said stages and an output coupled to one said power amplifier input, and means coupling the individual output of one said stage to the input of the other said power amplifier.

7. A repeater station arrangement for position control, by variance from a phase opposed condition of two control voltages, of a two phase induction motor having quadrature field windings, comprising; a motor position to voltage phase translator having a primary circuit for energization by one such control voltage, a secondary output circuit and a mechanical input driven by the motor for determining phase relation of the output circuit voltage relative to an energizing primary input voltage in accordance with motor position, a voltage summarizing circuit having two inputs and a single output, means for applying to said inputs respectively the secondary circuit output of the translator and a second such control voltage, an amplifier having an input coupled to the output of said voltage summarizing circuit and an output coupled to one said field winding, a second amplifier having an input and an output coupled to the second said field winding, and means for applying to the input of said second amplifier such second control voltage.

RAYMOND A. RUNYAN.

No references cited.